Figure 1:
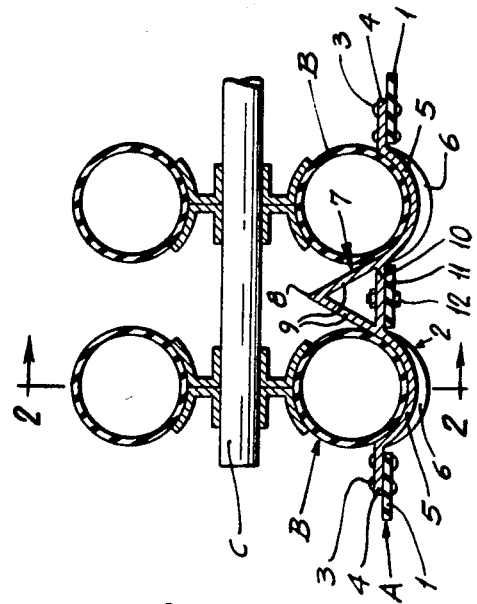

United States Patent

[11] 3,604,763

| [72] | Inventor | John C. Maguire, deceased<br>late of Cookshire Highway, Lennoxville,<br>Quebec, Canada (by Ivy Maguire,<br>administrator and executrix) |
|---|---|---|
| [21] | Appl. No. | 837,379 |
| [22] | Filed | June 27, 1969 |
| [45] | Patented | Sept. 14, 1971 |

[54] ENDLESS TRACK FOR TRACK-LAYING VEHICLES
5 Claims, 2 Drawing Figs.

[52] U.S. Cl. ................................................ 305/35 EB, 305/56
[51] Int. Cl. .................................................. B62d 55/24
[50] Field of Search .......................................... 305/35 EB, 37, 38, 56

[56] References Cited
UNITED STATES PATENTS

| 1,501,097 | 7/1924 | Chase ........................ | 305/35 EB |
| 2,124,708 | 7/1938 | Peter .......................... | 305/56 |
| 2,786,725 | 3/1957 | Thorne ....................... | 305/37 |
| 2,992,862 | 7/1961 | Fredricks .................... | 305/35 X EB |

Primary Examiner—Richard J. Johnson
Attorney—Pierre Lesperance

ABSTRACT: An endless track for track-laying vehicles having pairs of tire wheels on each side thereof, the endless track consisting of three endless belts interconnected by rigid cross links having a pair of curved portions to receive the tires of a tire wheel, and an inwardly extending V-shaped track guard engaging the inner sides of the tires to prevent the endless track from coming off the tire wheels.

PATENTED SEP 14 1971 3,604,763

INVENTOR
John C. MAGUIRE
deceased
BY Pierre Lespérance

PATENT AGENT

ENDLESS TRACK FOR TRACK-LAYING VEHICLES

The present invention relates to a new construction of an endless track laying vehicles.

It is known to provide vehicles having endless tracks composed of rubberlike belts and of metal lags or cross links uniting the belts and in which the belts are trained on tire wheels of the vehicle.

In the usual constructions, the cross links are provided with track guards engaging the outside of the tire wheels to prevent the endless track from getting off the wheels during use of the vehicle. However, it has been found that when the vehicle travels over rough ground, the endless tracks frequently get off the wheels, due to the lateral and torsional forces exerted on the track.

It is the general object of the invention to provide an endless track of the character described, which obviates the above-mentioned disadvantage in that the track is very stable and will not come off the tire wheels of the vehicle, even when the latter negotiates very rough ground.

In accordance with the invention, the endless track is in association with series of pairs of tire wheels, the cross links of the track being provided with a single track guide engaging between the tire wheels of each pair and said cross links being devoid of any track guide or guard, on the outside of the tire wheels of each pair.

Figure 2:
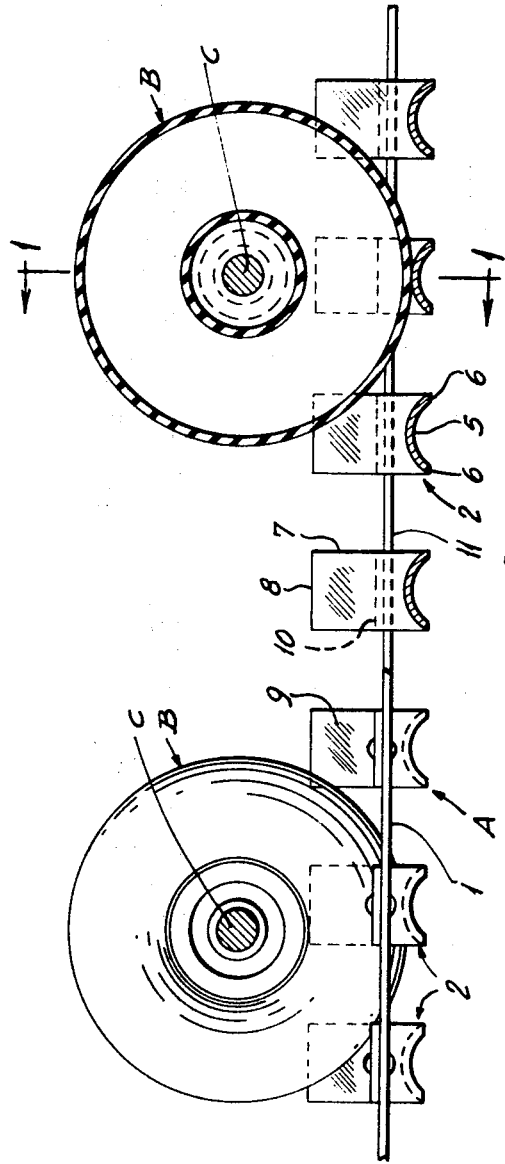

The foregoing will become clearer in the following description and by referring to the drawings, in which:

FIG. 1 is a cross section of a pair of tire wheels of an endless track vehicle provided with the endless track of the invention, said cross section being taken along line 1—1 of FIG. 2; and FIG. 2 is a side elevation, partially in longitudinal section, of the tire wheels and endless track arrangement, the part in section being taken along line 2—2 of FIG. 1.

In the drawings, like reference characters indicate like elements throughout.

A portion of the endless track of the present invention is indicated at A, said endless track being trained on longitudinally spaced pairs of tire wheels B of an endless track vehicle, not shown.

The endless track A is engaged by several pairs of tire wheels B and by driving sprocket at the front of the vehicle, and the return run of the track may engage the top portions of the tire wheels, if so desired.

The endless track A is adapted to be used in association with pairs of tire wheels B mounted on common shafts C, which normally are idler shafts.

The vehicle is normally provided with two endless tracks, one on each side of the vehicle and, consequently, the idler shaft C will carry two pairs of tire wheels B, one on each side of the vehicle.

The endless track A in accordance with the invention is composed of at least two flexible rubberlike endless belts 1 interconnected by rigid metal cross links or lags 2. The cross links 2 are spacedly disposed along the endless belts 1 and are rigidly secured thereto by means of rivets or bolts 3. More specifically, the cross links 2 are made of flat stock with coplanar end portions 4, themselves secured to the endless belts 1, either on the inside or the outside of the belts. In FIG. 1, the ends 4 of cross links are shown secured on the inside of the belts. Obviously, an additional metal member may be secured by the rivets 3 on the outside of the belts to further protect the belts, if desired.

Each cross link is longitudinally bent to from two spaced longitudinally curved tire engaging portions 5. These longitudinally curved portions 5 are in turn transversely curved to form wings 6 directed outwardly of the endless track, so as to engage the ground and provide grip.

The two longitudinally curved portions 5 are interconnected by a V-shaped track guide 7 having an apex 8 and two diverging straight legs 9, said straight legs forming a continuation and being integral with the inside ends of the two longitudinally curved portions 5.

A bridge part 10, of flat stock, is welded or otherwise rigidly secured to the base of the V-shaped track guide 7 to form a triangle therewith, said bridge member 10 being substantially coplanar with the ends 4 of the cross link.

Preferably, a third rubberlike endless belt 11 is secured to the bridge portion 10 on the outside thereof by means of bolts or rivets 12. Thus, the three belts 1 and 11 lie in a common plane.

The V-shaped track guide 7 is of such a width and shape as to engage the inside lateral portions of the tire of wheels B of the pair of tire wheels. Thus, the track guide 7 has its apex directed away from the cross link 2. The height of the track guide may vary and the inclination of the straight legs 9 may also vary, but in all cases they are calculated to engage a portion of the inside lateral surface of the tires of the wheels, just sufficient to guide the track in normal travel in order to reduce friction between the track guide and the tires.

The height of the track guide 7 is preferably substantially equal to the circumferential thickness of the tire 8, although this height may vary.

It is noted that no track guards whatever are provided on the coplanar ends 4 of the cross links 2 and that the single track guide 7 is high enough to prevent the endless track from disengaging the pair of tire wheels 8, even when the track is subjected to torsion and lateral pressure.

This has been found to be the case in practice. In fact, an endless track vehicle provided with the endless track system in accordance with the invention has been found to be capable of negotiating very rough ground without the endless track ever getting off the tire wheels.

What I claim is:

1. In an endless track vehicle having series of pairs of spaced tire wheels engaging an endless track, each endless track comprising a pair of spaced substantially parallel rubberlike endless flexible belts, and rigid cross links spacedly disposed longitudinally of said belts and having their ends secured to said belts, and a single track guide secured to said links substantially centrally thereof and protruding in the space between said pairs of tire wheels, said cross links having longitudinally curved portions on each side of said track guide for mating engagement with said tire wheels, said track guide being substantially V-shaped with the apex directed away from the links and being a continuation of said curved portions.

2. In an endless track vehicle as claimed in claim 1, wherein said cross links have substantially coplanar ends to which said belts are secured and further including a bridge portion extending between said curved portions and across said track guide, and a third rubberlike flexible endless belt to which said bridge portions are secured.

3. In an endless track vehicle as claimed in claim 2, wherein said coplanar ends and said bridge portions are secured on the inside of the loops formed by said first-named and said third endless belts.

4. An endless track for track laying vehicles, comprising a pair of substantially parallel rubberlike flexible endless tracks and rigid cross links spacedly disposed longitudinally of said belts, each cross link comprising a rigid strip, of flat stock, having substantially coplanar ends secured to said belts, two spacedly longitudinally curved portions disposed on one side of the plane of said ends and a substantially V-shaped track guide disposed between said curved portions and on the other side of said plane with the apex directed away from said plane and the legs of said track guide forming a continuation of said curved portions.

5. An endless track as claimed in claim 4, further including a bridge portion extending between, and secured to, said curved portions and disposed across the legs of said V-shaped track guide, and a third rubberlike flexible endless belt to which said bridge portion is secured.